United States Patent
Chamorro Alonso et al.

(10) Patent No.: US 11,738,525 B2
(45) Date of Patent: Aug. 29, 2023

(54) COMPOSITE FORMING STATION

(71) Applicant: AIRBUS OPERATIONS, S.L.U., Madrid (ES)

(72) Inventors: Francisco Javier Chamorro Alonso, Madrid (ES); Pedro Nogueroles Viñes, Madrid (ES); Aquilino García García, Madrid (ES); Jorge Juan Galiana Blanco, Madrid (ES); Augusto Pérez Pastor, Madrid (ES); Julián Martín Isabel, Madrid (ES)

(73) Assignee: AIRBUS OPERATIONS, S.L.U., Madrid (ES)

( * ) Notice: Subject to any disclaimer, the term of this patent is extended or adjusted under 35 U.S.C. 154(b) by 306 days.

(21) Appl. No.: 16/887,680

(22) Filed: May 29, 2020

(65) Prior Publication Data
US 2020/0376790 A1    Dec. 3, 2020

(30) Foreign Application Priority Data

May 29, 2019   (EP) .................................... 19382433

(51) Int. Cl.
| | | |
|---|---|---|
| *B29C 70/50* | (2006.01) | |
| *B29C 53/04* | (2006.01) | |
| *B29C 65/00* | (2006.01) | |
| *B29C 70/44* | (2006.01) | |
| *B29D 99/00* | (2010.01) | |
| *B29C 70/54* | (2006.01) | |
| *B29L 31/00* | (2006.01) | |

(52) U.S. Cl.
CPC .......... *B29C 70/504* (2013.01); *B29C 53/043* (2013.01); *B29C 66/43441* (2013.01); *B29C 70/44* (2013.01); *B29C 70/549* (2021.05); *B29D 99/0003* (2013.01); *B29L 2031/001* (2013.01)

(58) Field of Classification Search
None
See application file for complete search history.

(56) References Cited

U.S. PATENT DOCUMENTS

| | | | | |
|---|---|---|---|---|
| 2005/0056362 A1* | 3/2005 | Benson | ................. | B29C 70/504 156/229 |
| 2009/0266468 A1* | 10/2009 | Pilpel | .................... | B29C 66/721 156/60 |
| 2010/0178454 A1 | 7/2010 | Brufau Redondo | | |
| 2015/0203186 A1 | 7/2015 | Lunney et al. | | |
| 2015/0367584 A1* | 12/2015 | Daton-Lovett | ...... | B29D 23/001 264/171.13 |

FOREIGN PATENT DOCUMENTS

EP    2 522 495    11/2012

OTHER PUBLICATIONS

Extended Search Report for EP19382433.1, dated Nov. 20, 2019, 9 pages.

\* cited by examiner

*Primary Examiner* — Christopher T Schatz
(74) *Attorney, Agent, or Firm* — Nixon & Vanderhye P.C.

(57) ABSTRACT

A composite forming station for forming a T-profile composite part from a planar laminate. The composite forming station includes in-line rollers arranged along a forming direction, wherein a thickness and/or edge angle each roller is greater than the preceding roller, wherein the rollers gradually splay apart feet sections of the planar laminate to convert the laminate to the T-profile composite part.

10 Claims, 3 Drawing Sheets

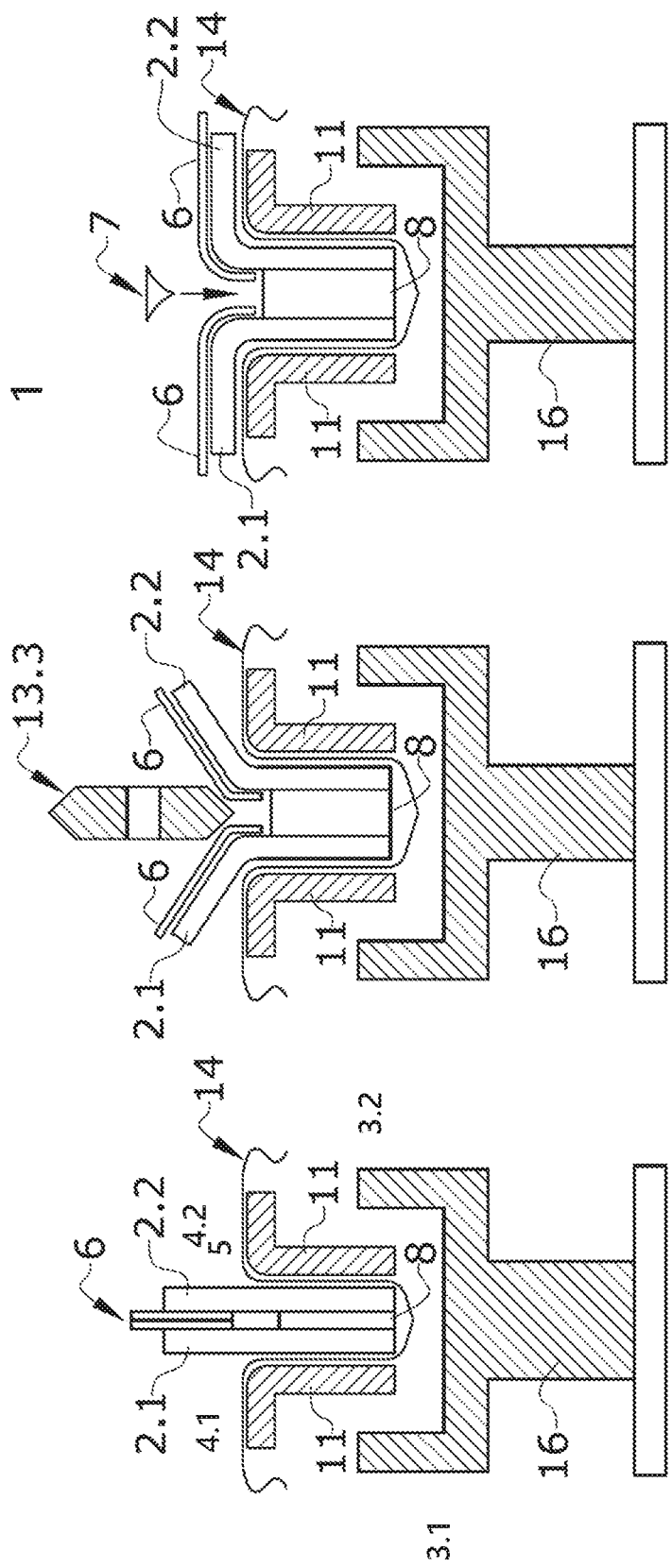

COMPOSITE FORMING STATION

RELATED APPLICATION

This application claims priority to European Patent Application EP19382433.1, filed May 29, 2019, the entirety of which is incorporated by reference.

TECHNICAL FIELD

The present invention belongs to the field of manufacturing composite parts. The invention provides a composite forming station for forming a T-profile composite part from a planar laminate.

The present invention may be embodied to provide a composite forming station integrating all necessary means to form a T-profile composite part from a planar laminate at a single composite forming station step. The T-profile composite part may be a stringer for an aircraft skin or panel. The composite forming station may further include a curing tool which may avoid having to move the formed-up composite parts to different manufacturing stations.

BACKGROUND

T-profile composite parts are normally used as stiffeners for adding rigidity and strength to adjacent load carrying panels or skin of an aircraft. Examples of T-profile composite parts are stringers applied to the inside surface of an aircraft skin. Stringers prevent the skin from buckling or bending under compression or shear loads. In addition, T-profile composite parts may transfer aerodynamic loads acting on the skin to other supporting structures, such as to frames, beams, and/or ribs.

T-profile composite parts are conventionally formed by bringing together and joining two L-shaped halves of the composite part. The L-shaped halves are mirror images of each other and are positioned such they abut and are joined along one of their webs, e.g., legs, to form such that their webs contact symmetrically.

The T-profile composite part is formed by joining respective webs of the L-shaped halves. The feet of the L-shaped halves extend perpendicularly form the webs in opposite directions. Once installed, the feet contact an inside surface of the skin or panel and the joined webs project perpendicularly from the feet and skin or panel.

Typically, to manufacture a T-profile composite part, each 'L-shape' half is manufactured separately. The main manufacturing steps are as follows:

Firstly, a number of composite plies, i.e. pre-pregs, are laid-up one upon the other in a flat manner to form a stack of plies. The outer surfaces of each stack of plies approximates a developable surface(s) of one of the 'L-shape' halves.

If necessary, these flat stacks of plies may be trimmed to the desire shape. The resulting planar laminate (trimmed or not) is known as a composite pre-form.

Secondly, each one of these planar laminates corresponding to a single 'L-shape' halve is bended by its folding line between the web and the foot in order to form-up an 'L-profile'. Typical forming-up technologies for this process are hot forming and press-forming; wherein hot-forming uses a membrane and heat, whilst the press-forming uses a press and force.

Finally, in short, both 'L-profiles' are positioned and put together making their respective webs contact symmetrically to achieve the desired 'T-profile'.

It is to be noted that this forming process of a 'T-profile' is nowadays performed in dedicated stations equipped with specific tools and machinery. Therefore, once the forming step is completed, the 'L-profiles' are transported and positioned on curing tools before moving to an autoclave or oven, for instance.

In addition, in some cases, a second forming operation is needed to finally adapt the 'T-profile' composite part obtained by joining both halves to the final shape of the curing tools.

To cure the uncured laminates, the formed 'T-profile' is subjected to a final co-curing cycle. Alternatively, both 'L-profiles' may be cured separately, and afterwards bonded together.

According to the production rate, any of the intermediate products: laminates, 'L-profiles', or even 'T-profiles' may be stored in conditioned areas to mitigate their degradation.

In the overall manufacturing process, the invention is directed to a pre-forming step to form T-profile composite parts. In particular, a bending step within the forming step causes internal movements between the composite plies to convert a planar laminate to a T-profile composite part.

In the bending step, a folding movement bends the web relative to the foot such that the web and foot are perpendicular to each other to form the L-shape. This provokes a progressive sliding of the plies creating compression on the internal plies and tension on the external ones. As a result, on the outer edge (free end) of the web it may be seen 'the book effect'. As the geometry of the desired preform becomes more complex (i.e. torsion, high curved radio), care need to be increase in the working principle of the bending operation.

Therefore, a forming operation may further entail a risk of creating wrinkles or undulations which, in principle, are sited on the web of the 'L-profile'. Particularly, this undesirable wrinkling effect takes places on the zones where the composite plies tend to be compressed preventing loads from being effectively transferred therethorough. Consequently, the final composite material stress drops down significantly.

Thus, 'T-profile' forming operation is a mass-production, critical, labor-intensive, multi-step process that requires high precision as a degree of refinement with which the steps are performed, with a great attention to details.

In manufacturing lines, the composites roll over different stages carrying operations, which constitute a time-demanding process impacting on the production rate of aircrafts. The combination of a number of steps and the high precision required may cause delays prompting a drawback for the aeronautical industry.

SUMMARY

The present invention may be embodied to solve or mitigate the aforementioned problems by a composite forming station for forming a T-profile composite part from a planar laminate thereof.

In a first inventive aspect, the invention provides a composite forming station for forming a T-profile composite part from a planar laminate thereof along a forming direction, the composite forming station comprising:

a guide adapted to align the composite part with the forming direction;

a heater; and a plurality of in-line rollers arranged so as to follow the forming direction, wherein each roller comprises a thickness and an edge angle; such that the thickness and/or the edge angle of the rollers is successively increased along the forming direction, in such a way that the composite forming station gradually opens and forms the planar laminate into the T-profile composite part as it passes for subsequent in-line rollers.

Unlike the conventional solutions where the two L-shaped halves were formed separately and then joined together prior to curing, the present invention utilizes a single planar laminate already comprising the two halves in their developable surfaces prior to bending.

The planar laminate may include a set of stacked plies, wherein a folding line divides the planar laminate into: a web portion for being part of the web of the T-profile composite part, and a foot portion comprising respective stacked feet of the T-profile composite part; wherein each foot is delimited a folding line and a free end. The stacked feet are separated by two release films.

The planar laminate is arranged on the guide of the composite forming station which provides a supporting element allowing the planar laminate to advance in a forming direction defined by the forming station. The web portion of the planar laminate may be arranged between the guide of the composite forming station so that the foot portion is left free.

As the planar laminate advances in such forming direction, the planar laminate comes upon different rollers arranged in-line following such forming direction. Each roller is different to the subsequent in that their thickness or edge angle is successively increased along the forming direction.

The rollers are adapted such that the planar laminate sequentially passes through the rollers. In particular, the feet of the planar laminate passes through the rollers so that the feet gradually bend away from each other to form the T-profile composite part. As the in-line rollers widens (i.e. increase in thickness), the planar laminate is obliged to open gradually such that each foot gradually bends further away from the other foot.

Similarly, by arranging the rollers to have progressively increasing edge angles the rollers gradually splay apart the feet of the planar laminate as the laminate moves through the composite forming station.

The edge angle of each of the in-line rollers defines a bending radius, at the folding line, between the feet and webs of the planar laminate. As the edge angle of the roller decreases, the bending radius gradually increases of each foot in the planar laminate. Both feet may be bended symmetrically by the rollers as the planar laminate moves through the composite forming station.

To aid this progressive forming of the T-profile composite part, heaters at the composite forming station may soften the planar laminate to facilitate the bending process.

Consequently, a smooth bending process of the planar laminate is achieved by the present forming station. Advantageously, undesired relative movement between plies is highly reduced as well as wrinkle effect avoided.

Further, as the web portion of the planar laminate is arranged between the guide of the composite forming station, the web edge is not subjected to bending in the same manner as does the prior art. Accordingly, the undesired 'book effect' on the web edge is eliminated, enabling a net shape on this web edge.

The composite forming station also integrates in one place all necessary means to form in a single step a T-profile composite part, such as a stringer, from a laminate thereof. Thus, the composite forming station advantageously allows reducing the lead time of the forming task before curing, increasing the production rate of 'T-profile' composite parts by means of a fast and cost-saving solution.

Potential misalignments of correctly positioning both 'L-profile' composite parts are avoided herein as both halves of the 'T-profile' are laminated together. That is, laminate positioning and shape accuracy is highly increased as the forming operation doesn't affect the web quality.

The final 'T-profile' composite part may continue to rest on the guide as it moves to an oven or autoclave for a final curing step in which the part is subjected to high pressure and temperature. Thus the guide may include an initial section to receive the planar laminate before the laminate moves into the composite forming station, a section extending through the composite forming station and a section extending from the station and to and into an autoclave or oven.

The present invention allows formation of a T-profile composite part without need for separate stations, and associated tooling, such as to form L-shaped halves, join the halves and prepare them for curing. As mentioned, the number of sub-steps and handling movements between both stations may be eliminated, as both process (forming-up the planar laminate and prepare it for subsequent curing in the curing tool) are carried out in a single one.

Furthermore, as the final shape of the 'T-profile' is achieved directly on the guide used for later curing thereof, the risks associated to misalignment between the conventional forming tools and the curing tool as well as the second forming operation to get the final shape on the curing tool is therefore eliminated.

In a particular embodiment, the guide includes sidewalls formed by two L-shape caul plates spaced apart by a pre-determined distance for placing the composite part therebetween.

The L-shapes of the caul plates conform to the final form of the final L-profile halves in the T-profile composite part. In addition, the pre-determined distance between both 'L-shape' caul plates corresponds to the web portion thickness of the planar laminate.

Particularly, both L-shape caul plates are configured to apply a tangential pressure to the planar laminate to keep it in correct position.

In a particular embodiment, the heater comprises: at the forward most of the forming direction, an infrared heater for pre-heating the planar laminate; and/or a resistance air heater along the forming direction for continuing heating the planar laminate as it gradually forms; and/or an air blow heater for blowing warmed air.

By this embodiment, the planar laminate is correctly pre-heated to start being formed (i.e. bended). As the composite part passes by the subsequent in-line rollers, it is gradually subject to a higher bending so that a surplus heating shall be advantageous to facilitate the process without affecting the 'T-profile' quality.

In a particular embodiment, the forward most roller of the plurality of in-line rollers, with the minimum edge angle has a substantially acute edge configured to separate a portion of the planar laminate corresponding to the feet of the T-profile composite part once formed.

The forward most roller has a substantially acute edge so that it entrains in the planar laminate forcing both foot to start bending away from the other. In particular, the substantially acute edge of the forward most roller is configured to separate the two release films in turn separating the respective stacked foot of the planar laminate.

In a particular embodiment, the last roller of the plurality of in-line rollers with the maximum edge angle has a substantially widened flat edge configured to set the portion of the planar laminate corresponding to the feet of the T-profile composite part perpendicular to the web.

In a particular embodiment, the composite forming station further comprises a vacuum bag arranged between the guide and adapted to receive the planar laminate.

Advantageously, this embodiment allows performing the forming operation directly on the curing tools as the vacuum bag is firstly placed on the curing tool before the planar laminate is arranged.

In particular, the use of the vacuum bag permits to place the composite forming station in an oven since the vacuum bag already exerts the necessary pressure over the composite part.

In a particular embodiment, the composite forming station further comprises a cooler(s) for blowing cooling air toward the formed composite part together with the last roller of the in-line rollers or during a subsequent step.

In a second inventive aspect, the invention A composite forming station configured to convert a planar laminate into a T-profile composite part, the method comprising: a guide including sidewalls separated by a gap conforming to a thickness of the planar laminate, wherein an upper surface of each of the sidewalls is aligned with a fold line of the planar laminate, and the sidewalls extend longitudinally through the composite forming station along a forming direction; and in-line rollers arranged sequentially along the forming direction and positioned above the gap, wherein each of the in-line rollers has a rotational axis perpendicular with a plane in the forming direction and parallel to the sidewalls; wherein a thickness and/or edge angle of an annular ridge of each of the in-line rollers successively increases from one of the rollers to a next one of the rollers and along the forming direction.

In a third inventive aspect, the invention provides a method for forming a T-profile composite part from a planar laminate thereof, the method comprising the steps of:

laying up a planar laminate composed by a set of stacked plies of woven or non-woven composite fiber and resin material, such planar laminate comprising a folding line dividing the planar laminate into:

a web portion for being part of the web of the T-profile composite part, and a foot portion comprising respective stacked foot of the T-profile composite part; wherein such foot are delimited by the folding line and a free end;

in such a way that the respective stacked foot are separated from each other by two release films;

providing a composite forming station for forming a T-profile composite part from the planar laminate according to any of the embodiments of the first inventive aspect;

arranging the web portion of the planar laminate between the guide of the composite forming station; and moving the planar laminate relative to the plurality of in-line rollers in the forming direction in such a way that rollers subsequently passes between the release films separating the stacked foot of the planar laminate;

so that the composite forming station gradually opens and forms the planar laminate into the T-profile composite part as it moves through subsequent in-line rollers.

Throughout this entire document, a 'ply' should be understood as a single continuous area of composite material, e.g., woven or non-woven fibers and resin material, to be laid on a form, where two plies in the same layer do not normally overlap. The laying-up step may be performed by well-known Automated Tape Laying (ATL) or Automated Fiber Placement (AFP) technologies.

It can be noted that, once the planar laminate is laid-up, the stack of plies may be trimmed to the required shape, eliminating material excess.

Throughout this entire document, a 'release film' should be understood as a thin plastic film either porous (referred to as perforated) or non-porous which prevents foreign materials from becoming integrated into the composite part.

The advantages discussed throughout the first inventive aspect can be similarly applied to the method of the second inventive aspect.

In a particular embodiment, the method further comprises the step of:

placing a rowing between the T-profile composite part foot for filling the gap where both foot diverts from each other.

A rowing is a composite filler adapted to fill the space between both feet (i.e. the diverting point of both halves of the 'T-profile' composite part). A 'roving' is normally understood as a bundle of fibres which may be unidirectional and unspun or otherwise shaped into patterns to provide structural continuity and void avoidance.

The rowing is manufactured independently, being afterward placed on such diverting point of the formed-up 'T-profile' composite part. The manufacturing of a rowing comprises the following steps: laying up a set of plies in a stacked manner; rolling-up the stacked plies up to form a cylinder; placing the rolled cylinder in a 'V-shaped' forming tool; positioning a vacuum bag on the 'V-shaped' forming tool comprising the rolled cylinder; and optionally, curing the rolled cylinder in a curing tool.

Then, the cured rowing is placed between the T-profile composite part foot and bonded thereto. Alternatively, both uncured rowing and T-profile composite part can be co-cured together.

Before placing the rowing between the T-profile composite part foot, the release films may have been removed.

In a particular embodiment, the two release films separating the stacked foot of the planar laminate extends from the folding line all over the foot portion.

Pre-preg plies are inherently sticky, so the bending away movement of both foot is prevented. By using release films, this separation is highly facilitated as the facing surfaces of the foot (inherent sticky) does not touch each other.

The two release films may project 10 mm out from the edge of the stacked foot of the planar laminate. This allows an easy handling to initially separate the portion of the planar laminate corresponding to the feet of the T-profile composite.

In a particular embodiment, the planar laminate is laid-up with a greater number of stacked plies within the web portion than the foot portion.

This extra stacked plies forms the so-called 'blade', that is, an additional element reinforcing the web of the 'T-profile' composite part arranged between respective webs of the 'L-profile' halves.

Unlike conventional techniques where an additional step for correctly placing the blade was necessary, the blade is, by the present invention, integrally laid-up with both 'L-profile' halves.

Therefore, the guide are distanced according to the web portion thickness of the planar laminate, including both halves plus the blade.

In a particular embodiment, the T-profile composite part is an aeronautical stringer.

Stringers are very common in the aeronautical industry since a typical aircraft requires large amounts of these reinforcing elements throughout the fuselage and wing, for instance.

Therefore, stringers are manufactured in mass production with a high level of automation, especially on assembly lines.

Thus, thanks to the simplicity and readily use of the present invention, the above advantages are stressed where the 'T-profile' composite part is an aeronautical stringer.

In another inventive aspect, the invention provides a T-profile composite part formable from a planar laminate by the method according to any of the embodiments of the second inventive aspect.

In a further inventive aspect, the invention may be embodied as a method for forming a T-profile composite part comprising:

laying up a planar composite laminate by stacking a first stack of plies of a woven or non-woven composite material, a release liner covering a foot portion of the first stack and a third stack covering a web portion of the first stack, and a second stack covering the release liner and the third stack, wherein the release liner and the third stack are sandwiched between the first and second stacks and the release liner is separated from the third stack along fold lines of the first and second stacks;

inserting the planar composite laminate into a gap between sidewalls of a guide in a composite forming station such that the web portion of the first stack and a web portion of the second stack are in the gap and each web portion faces one of the sidewalls, and wherein the foot portion of the first stack and a foot portion of the second stack extending out of the gap, moving the planar laminate through the gap in the guide along a forming direction parallel to the sidewalls;

as the planar laminate moves through the gap, inline rollers pass between the feet portions of the first and second stack, wherein each successive roller of the inline rollers has a thickness and/or edge angle of an annular ridge which is larger than a preceding roller of the inline rollers along the forming direction;

splaying the feet portions apart as the inline rollers pass between the feet portions, wherein each of the splaying includes bending feet portions about the fold lines until the feet portions are each adjacent an upper surface of a respective one of the sidewalls of the guide;

heating the planar laminate before and/or during the movement of the planar laminate through the gap such that the planar laminate is heated while moving through the gap, and discharging from the guide the T-profile composite part formed from the planar laminate.

A remarkable feature of the T-profile composite part formed by the method according to the invention is a net shape on the web edge as the undesired 'book effect' thereon is eliminated. In addition, wrinkling effect is no longer present in a T-profile composite part formed by the present method.

All the features described in this specification (including the claims, description and drawings) and/or all the steps of the described method can be combined in any combination, with the exception of combinations of such mutually exclusive features and/or steps.

SUMMARY OF THE DRAWINGS

These and other characteristics and advantages of the invention will become clearly understood in view of the detailed description of the invention which becomes apparent from an embodiment of the invention, given just as an example and not being limited thereto, with reference to the drawings.

FIGS. 3a to 3c show three cross-sectional views of the composite forming station: before forming, during forming and after formed.

DETAILED DESCRIPTION

The skilled person in the art recognizes that aspects of the present invention described hereinafter may be embodied either as a composite forming station (10) or a method for forming a T-profile composite part (1) from a planar laminate (2).

Figure 1:
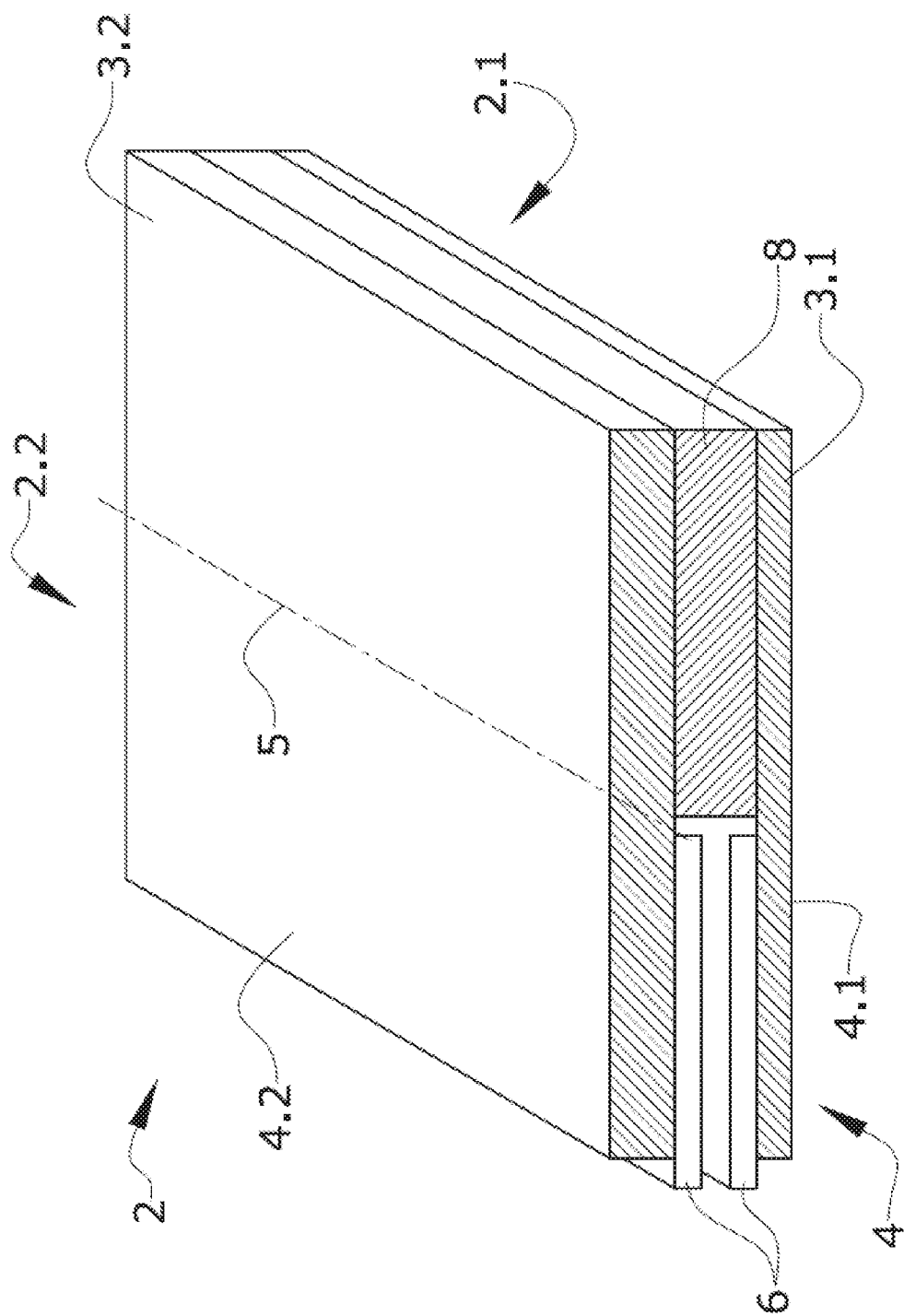
FIG. 1 shows planar laminate composed by a set of stacked plies, such planar laminate comprising a folding line dividing the planar laminate into a web portion and a foot portion according to the present invention.

FIG. 1 depicts a planar laminate (2) composed by a set of stacked plies to be processed by the composite forming station (10).

The planar laminate (2) includes a folding line (5) dividing the planar laminate between a web portion (3) and a foot portion (4). The web portion (3) will form part of the web of a T-profile composite part (1). The foot portion (4) includes respective feet (4.1, 4.2) of the T-profile composite part.

In particular, the planar laminate (2) comprises two equal halves (2.1, 2.2) that will form part of the 'T-profile'. The halves may each be formed to have an L-profile. Each half (2.1, 2.2) may be laid up with the same number of plies to balance load transferring.

Each half (2.1, 2.2) of the planar laminate (2) comprises a web portion (3.1 or 3.2) and a foot (4.1 or 4.2). Each half may be a stack of non-woven or woven plies of fiber and resin composite material. The halves form a first and second stack of plies of the composite material. Release films (6) are between the feet and each on a surface of the feet. The two release films (6) separate the feet (4.1, 4.2) of the halves (2.1, 2.2) of the planar laminate.

Also separating the halves (2.1, 2.2) of the planar laminate is an additional (third) stack of plies (8) between with the web portion (3). The additional stack of plies forms a 'blade' of the web once the 'T-profile' composite part (1) is formed. The additional stack of plies (8) in the web portion (3) of the planar laminate (2) may be introduced during the same laying sequence than the release films (6) are introduced.

During the laying-up process, a first half (2.1) is laid-up up to comprise a web (3.1) and foot (4.1) portions. Then, the additional plies (8) are laid up over the web portion (3.1) of the first half to form the blade. And, at the same time, two stacked release films (6) are place on the foot portion (4.1) of the first half. The respective feet are delimited by their respective folding lines (5) and the free ends of the feet. The release films (6) cover the entire area of the foot (4.1). Optionally, the release films (6) may extend beyond the free ends of the feet portions (4.1, 4.2), such as extending 10 mm beyond the free end of the feet portions, as is shown in FIG. 1.

After the first half (2.1), additional plies (8) and release films (6) are laid-up, e.g. stacked, the other half (2.2) of the planar laminate is laid-up over the stack of plies (8) and an upper release film of the release films (6).

Figure 2:
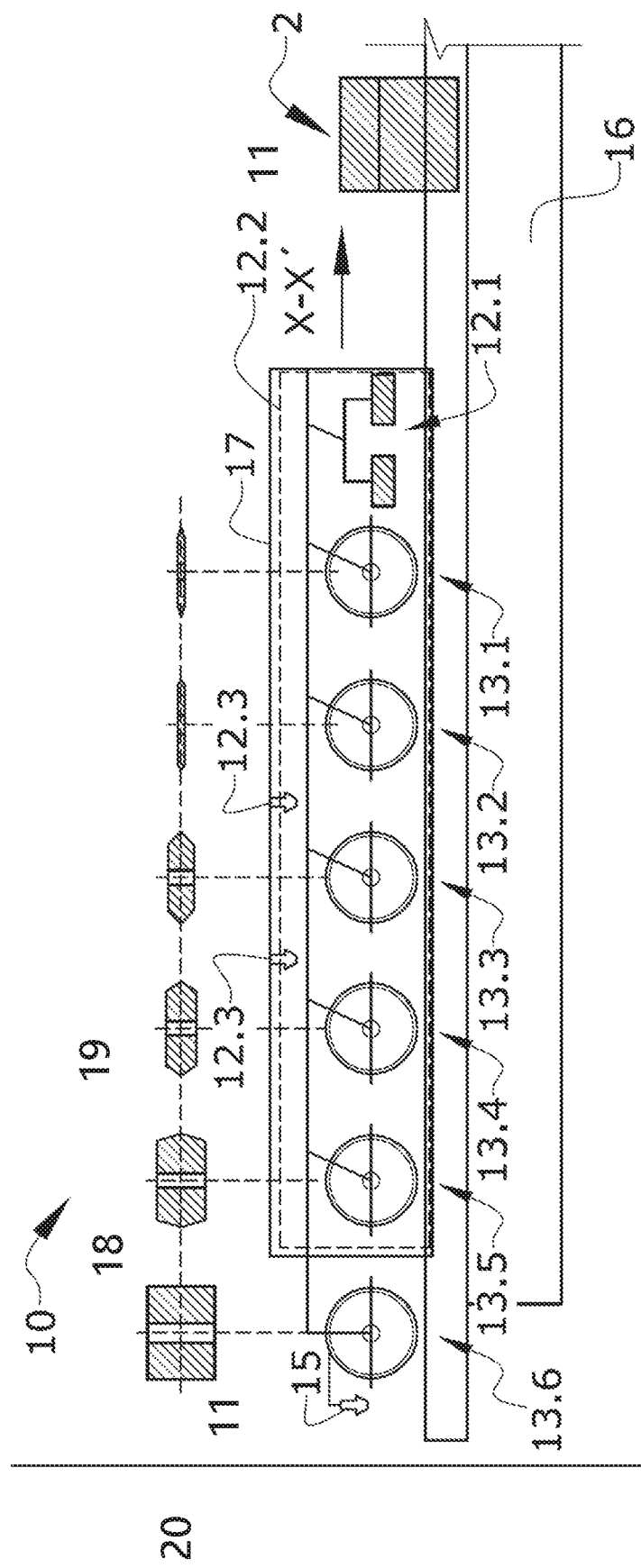
FIG. 2 shows a schematic representation of an embodiment of the composite forming station according to the present invention.

FIG. 2 depicts a schematic representation of a composite forming station (10) according to the present invention.

The composite forming station (10) comprises: a guide (11, see FIGS. 3A, 3B and 3C) adapted to align the composite part with a forming direction (x-x'); at least one heater (12.1, 12.2, 12.3); and a plurality of in-line rollers (13.1 to 13.6). The heater(s) and rollers are arranged along the forming direction (x-x') and aligned with a plane extending along the forming direction and a center of the guide. Each of the in-line rollers (13.1 to 13.6) comprises a thickness (18) and an edge angle formed by an annular ridge (19) at the outer circumference of the rollers.

The thickness and/or the edge angle of the rollers is successively increased along the forming direction (x-x') and along the movement direction (left to right in FIG. 2) of the planar laminate (2) through the composite forming station. Due to the increasing thickness and/or edge angle of the in-line rollers, the composite forming station (10) gradually opens and forms the planar laminate (2) into the T-profile composite part (1) as the planar laminate (2) moves through line rollers (13.1 to 13.6).

As shown in FIG. 3A, the planar laminate (2) is inserted between inverted L-shaped guide walls of the guide (11). In particular, the web portion (3) of the planar laminate (2) is arranged between the guide walls of the guide (11) of the composite forming station (10).

The foot portion (4) extends above the guide (11) and is free from support. The foot portion (4) of the planar laminate (2) is left free so that the plurality of rollers (13.1 to 13.6) can sequentially pass between the feet (4.1, 4.2) and bend the feet about the fold line (5). As the planar laminate (2) advances through the composite forming station and between the rollers (13.1 to 13.6) along the forming direction (x-x') the advance is guided by the guide (11). As each of the rollers passes between the feet (4.1, 4.2), the feet are gradually bend from a vertical orientation (see FIG. 3A) to a horizontal orientation (see FIG. 3C). As shown in FIG. 3C, the planar laminate (2) is formed into a T-profile composite part (1) as the part moves through the composite forming station.

As it can be seen from FIG. 2, each roller (13.1 to 13.6) differs from the other rollers due to rollers successively increase in thickness and edge angle along the forming direction (x-x').

The forwardmost roller (13.1) (in the forming direction and the roller which first acts on the planar laminate) has a narrow thickness (18) and/or a small acute angle of its ridge (19), as compared to successive rollers. The forwardmost roller (13.1) initially splits the feet (4.1, 4.2) and the splitting is assisted by the narrow thickness of the roller (13.1) and small edge angle of the rim of the roller. Further, the narrow thickness and small angle allow the forward most roller (13.1) to pass through the release films (6). Further, the forward most roller (13.1) may have such a small thickness that the roller is effectively a flat disc with a small thickness as compared to its diameter to ease penetration between release films (6).

Six in-line rollers (13.1-13.6) are represented in FIG. 2. The number of in-line rollers shown in FIG. 2 is exemplary. The number of rollers in a composite forming station may vary from six. The number of in-line rollers and their sizes and arrangements should be selected to allow the feet (4.1, 4.2) of the planar laminate (2) to be gradually spread apart to form the T-profile composite part (1) as the laminate passes through the in-line rollers (13.1 to 13.6).

Moreover, although only a T-profile composite part (1) is described herein (i.e. where the web is substantially perpendicular to the feet), other profiles of the composite part, such as C, W, M or V profiles, can be achieved by controlling the position with respect to the planar laminate (2) and guide (11), and the shape, thickness and edge angle(s) of the rollers (13.1 to 13.6).

For instance, in FIG. 2, the last roller (13.6) of the plurality of in-line rollers (13.1 to 13.6) has a maximum edge angle to bend the feet into a final horizontal orientation such that the feet are at (90°) to the web and thereby conform to the desired shape of the T-profile composite part (1).

From the forwardmost roller (13.1) to the last one (13.6), the in-line rollers (13.1 to 13.6) successively increase in thickness and edge angle in the example shown in FIG. 2. For instance, as the edge angle (acute angle) of the ridge of the forwardmost roller is (a), the edge angle of next roller should be increased to (b), wherein (b) which is higher than (a): 'b>a'. The edge angle for successive rollers may be increases for all of the in-line rollers.

Similar to the expanding edge angle, the thickness of the rollers (13.1 to 13.6) may widen with the expanding edge angle or in place of an expanding edge angle. The thickness of each successive roller is wider than the preceding roller and narrower than the following roller along a movement direction of the laminate (2) through composite forming station.

The diameter of the rollers and the position and orientation of the axis of the rollers with respect to the guide (11) remain constant for all of the rollers (13.1 to 13.6).

In FIG. 2, above each roller (13.1 to 13.6) location within the composite forming section, is a cross-sectional image of the roller to illustrate the increasing thickness and edge angle of the successive rollers.

The planar laminate (2) may be heated at a forwardmost position in the composite forming station (10). A pre-heating device, such as an infrared heater (12.1), may heat the planar laminate. The composite forming station (10) may also include an additional heater, such as a resistance air heater (12.2), positioned along the forming direction (x-x') and along the series of in-line rollers to provide continuing heating of the planar laminate (2) as the laminate moves through the composite formation station. Similarly, the planar laminate may be heated by an air blow heater (12.3) that provides to homogenize warmed air to the laminate as it moves through the guide (11) and the composite forming station (10).

The composite forming station (10) may include an external housing (17) to enclose the heater (12.1, 12.2, 12.3) as well as the guide (11) and some or all of the rollers (13.1 to 13/6). The housing (17) may include a roof that supports include the resistance air heaters (12.2) above the rollers and guides and thereby form a heating box that includes the rollers and guide.

Adjacent to the last roller (13.6) of the in-line rollers, the composite forming station (10) may include a cooling device (15), such as a fan, for blowing cooling air toward and over the formed T-shaped composite part (1). The cooling device (15) may be mounted directly on the last roller (13.6), especially if the last roller is outside of the housing (17). Alternatively or in addition, the cooling device(s) may be mounted downstream of the last roller in the movement of the T-shaped composite part (1).

The cooling devices (15) are configured to cool down the formed 'T-profile' composite part (1). Cooling the part (1) assists in ensuring that the part maintains the T-shaped profile such as during subsequent handling. In view of a desire to cool the T-profile composite part (1), the last roller (13.6) may be outside of the housing (17) and thus away from the heat generated by the heaters (12.1, 12.2, 12.3). Also to be away from the heat of the heaters, the cooling device (15) is outside of the housing (17).

The composite forming station (10) may be placed on and supported by a beam (16) aligned with the forming direction (X-X').

FIGS. 3a to 3c depict three different cross-sectional views of the composite forming station (10) corresponding to three different positions in the composite forming station (10) and along the forming direction (X-X'). FIGS. 3A to 3B, show the planar laminate (2) at three different positions along the forming direction (X-X').

In FIG. 3A, the planar laminate (2) is between the sidewalls of the guide (11) and the feet (4.1, 4.2) have not been split by a roller. FIG. 3a depicts a schematic representation about how the planar laminate (2) is arranged between the sidewalls of the guide (11) to be aligned with the forming direction (x-x') in the composite forming tool (10).

The sidewalls of the guide (11) may be inverted L-shaped caul plates. The plates are separated from each other by a pre-determined distance corresponding to thickness of the web portion (3) of the planar laminate (2) (with or without 'blade' (8)). The 'L-shaped' caul plates of the guide (11) further constrain the final form of each final 'L-profile' halves (2.1, 2.2) of the 'T-profile' composite part. After being formed, the 'T-profile' composite part may rest on the L-shape caul plates as the part is an oven or autoclave for a final curing step. Thus, the guide (11), with the inverted L-shape caul plates (11), may extend into the over and form a portion of a curing tool with the oven.

In FIG. 3B, the laminate (10) is about half-way through the composite forming station (10). The feet (4.1, 4.2) are show in FIG. 3B as being splayed apart by an in-line roller 13.3. The rollers contact the release liner 6. The rollers push the feet (4.1, 4.2) apart such that the halves (2.1, 2.2) of the planar laminate bend along the fold lines (5). The elbow in the L-shaped caul plates assist in causing the halves to bend about the fold lines (5).

A vacuum bag (14) is arranged between the L-shape caul plates (11) so that it receives the planar laminate (2) as shown in FIG. 3A. Although only the vacuum bag (14) is represented and discussed herein, the person skilled in the art recognizes that other vacuum equipment such as a vacuum pump, vacuum gauges, valves, clamps, hoses, connectors, sealing tape, breather, etc. may need to be installed in the composite forming tool (10).

FIG. 3B depicts the same planar laminate shown in FIGS. 3A and 3C, at a different position along the forming direction (x-x') in the composite forming tool (10). In the position shown in FIG. 3B, the planar laminate has already passed the forwardmost roller (13.1) whose acute edge entrained between the two release films (6) forcing both foot portions (4.1, 4.2) to start bending away from the other. The situation show in FIG. 3b corresponds with the third roller (13.3) of the plurality of rollers (13.1 to 13.6) shown in FIG. 2.

On each side of the edge angle of this roller (13.3), a different foot (4.1, 4.2) of the composite part is rolled to bend the foot about the fold line (5) and push the foot towards the a horizontal leg of the caul plate of the guide (11).

The edge angle of each in-line roller (13.1 to 13.6) defines a bending radius of the foot (4.1, 4.2) about the fold line (5). While the edge angle forces the feet (4.1, 4.2) to bend apart, the L-shape caul plates of the guide (11) support the web portions (3.1, 3.2) to assist with the bending of the feet. The feet (4.1, 4.2) may be bent symmetrically by the rollers.

FIG. 3C corresponds shows the composite part (1) after passing through all the rollers of the plurality of rollers (13.1 to 13.6). FIG. 3C shows the planar laminate (2) after it has been fully formed into the 'T-profile' composite part (1) in the composite forming station (10). The conversion of the planar laminate (2) into the T-profile composite part (1) may be accomplished automatically as the planar laminate moves through the composite forming structure. During conversion, the planar laminate remains in the guide and slides through the guide such as by the rollers. The guide (11) may remain stationary. The rollers may remain at the same position along the formation direction (X-X'), wherein the movement of the rollers is confined to rotating about their respective axes.

In FIG. 3C, the feet (4.1, 4.2) have been folded to a horizontal orientation. The feet (4.1, 4.2) and the web portions (3.1, 3.2) are formed to conform to side surfaces of the inverted L-shaped caul plates of the guide (11). In particular it can be seen that both halves (2.1, 2.2) of the 'T-profile' rests on respective L-shape caul plates (11).

FIG. 3C shows a rowing (7), e.g., an elongated beam with an inverted triangular cross-section, is to be placed in a groove formed in the T-profile by the feet (4.1, 4.2). The rowing (7) fills the groove formed as the feet diverts away from the web portions (3.1, 3.2)

The vacuum bag (14) may be dimensioned to cover at least the web portion (3.1, 3.2) of the 'T-profile' composite part (1) and the entire outer surfaces of both L-shape caul plates of the guide (11).

After formed and after moving beyond the rollers (13.6) and the cooling device (15), the T-profile composite part (1) may continue to rest on the L-shape caul plates of the guide (11), especially if the caul plates extend to an oven or autoclave (20). The T-profile composite part (1) may remain on the caul plates of the guide (11) from just before the housing (17) of the composite forming station (10), through the station (10) and into the oven or autoclave (20). The T-profile composite part is cured in the oven or autoclave.

The cured 'T-profile' composite part (1) may be co-bonded with a base laminate for final arrangement. In aeronautics, the formed and cured T-profile composite part, e.g., a stringer, is arranged on a skin or panel by co-bonding the feet (4.1, 4.2) and the rowing (7) to the skin or panel, such as to an inside surface of the skin. The web portions (3.1, 3.2) projecting perpendicularly out from the skin or panel.

Alternatively, the formed 'T-profile' composite part (e.g. the stringer) may be positioned on the base laminate in the final arrangement, and then both parts co-cored together.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A composite forming station configured to convert a planar laminate into a T-profile composite part, the composite forming station comprising:
- a guide including sidewalls separated by a gap conforming to a thickness of the planar laminate, wherein an upper surface of each of the sidewalls is aligned with a fold line of the planar laminate, and the sidewalls extend longitudinally through the composite forming station along a forming direction; and
- in-line rollers arranged sequentially along the forming direction and positioned above the gap, wherein each of the in-line rollers has a rotational axis perpendicular to a plane in the forming direction and parallel to the sidewalls; and
- a housing containing all of the in-line rollers except for a last of the inline rollers;
- wherein a thickness and/or edge angle of an annular ridge of each of the in-line rollers successively increases from one of the rollers to a next one of the rollers along the forming direction.

2. The composite forming station according to claim 1, wherein the guide includes an inlet section extending forward of an inlet of the housing and an outlet section extending rearward of an outlet of the housing.

3. The composite forming station of claim 1, wherein the in-line rollers each have an annular edge at an outer circumference of the in-line roller, and a plurality of the annular edges are aligned with upper edges of opposing side-walls of the guide along a direction perpendicular to a plane of the gap.

4. The composite forming station of claim 1, wherein the annular edge of the in-line rollers is at the outer circumference of the in-line roller, and a plurality of the annular edges are aligned with the upper surfaces of the opposing sidewalls of the guide along the direction perpendicular to the plane of the gap.

5. The composite forming station according to claim 1, wherein the guide includes inverted L-shaped caul plates separated by the gap.

6. The composite forming station according to claim 1 further comprising heaters including:
- an infrared heater forward of a forwardmost roller of the inline rollers, wherein the infrared heater is configured to pre-heat the planar laminate; and/or
- a series of resistance air heaters proximate the in-line rollers and arranged along the forming direction, wherein the resistance air heaters are configured to heat the planar laminate as the planar laminate moves through the in-line rollers; and/or
- an air blow heater configured to blow warmed air over the planar laminate as the planar laminate moves through the in-line rollers.

7. The composite forming station according to claim 1, wherein an annular edge of a forward-most roller of the in-line rollers has a minimum edge angle of all of the in-line rollers, and the annular edge of each successive roller of the in-line rollers has an edge angle greater than the minimum edge angle and greater than the edge angle of the annular edge of the preceding in-line roller.

8. The composite forming station according to claim 1, wherein the last roller of the in-line rollers includes a wide annular ridge aligned along a straight line along a direction perpendicular to a rotational axis of the last roller.

9. The composite forming station according to claim 1, further comprising a vacuum bag proximate the guide and adapted to receive the planar laminate.

10. The composite forming station according to claim 1, further comprising a fan configured to blow cooling air toward the T-profile composite part at or downstream of the last roller of the in-line rollers.

* * * * *